US012747610B2

(12) United States Patent
Cnockaert

(10) Patent No.: US 12,747,610 B2
(45) Date of Patent: Sep. 29, 2026

(54) MORTICED BOLT KEEP AND A CLOSURE SYSTEM COMPRISING THE SAME

(71) Applicant: LOCINOX, Waregem (BE)

(72) Inventor: Arne Cnockaert, Dadizele (BE)

(73) Assignee: LOCINOX, Waregem (BE)

( * ) Notice: Subject to any disclaimer, the term of this patent is extended or adjusted under 35 U.S.C. 154(b) by 49 days.

(21) Appl. No.: 18/968,004

(22) Filed: Dec. 4, 2024

(65) Prior Publication Data

US 2025/0179834 A1 Jun. 5, 2025

(30) Foreign Application Priority Data

Dec. 4, 2023 (EP) .................................... 23214079

(51) Int. Cl.
*E05B 15/02* (2006.01)
*E05B 15/00* (2006.01)
*E05B 47/00* (2006.01)

(52) U.S. Cl.
CPC ...... *E05B 15/0205* (2013.01); *E05B 15/0073* (2013.01); *E05B 47/0004* (2013.01); *E05B 2015/023* (2013.01)

(58) Field of Classification Search
CPC ............. E05B 47/0002; E05B 47/0006; E05B 47/0038; E05B 47/0046; E05B 47/026;
(Continued)

(56) References Cited

U.S. PATENT DOCUMENTS 508,518 A * 11/1893 Johnson .............. E05B 47/0047 292/341.16
3,751,086 A * 8/1973 Geringer ............. E05B 47/0002 292/144
(Continued)

FOREIGN PATENT DOCUMENTS

BE 1025390 A1 * 2/2019 ........... E05C 19/168
DE 102004030362 A1 * 2/2006 ........... B66B 13/143
(Continued)

OTHER PUBLICATIONS

Espacenet.com, machine translation of EP3045622A1, generated Mar. 20, 2026 (Year: 2026).*
(Continued)

*Primary Examiner* — Kristina R Fulton
*Assistant Examiner* — Emily G. Brown
(74) *Attorney, Agent, or Firm* — Dickinson Wright PLLC

(57) ABSTRACT

A morticed bolt keep to cooperate with a lock having a latch bolt which is slidable between a retracted position and an extended position is disclosed. The morticed bolt keep comprises: an elongated body to be positioned inside a hollow tubular member; a cavity to receive the latch bolt in its extended position; a latch bolt engager which is displaceable between a rest state and an actuated state; and a magnetic actuator to displace the latch bolt engager from its rest state to its actuated state upon activation. The magnetic actuator comprises: a core which extends in a longitudinal direction and comprises at least one permanent magnet; and a coil assembly which extends in the longitudinal direction and comprises at least one coil, wherein one of the core and the coil assembly is slidable in the longitudinal direction and is operatively connected to the latch bolt engager.

17 Claims, 9 Drawing Sheets

(58) Field of Classification Search
CPC .. E05B 47/0603; E05B 63/244; E05B 63/248; E05B 15/0073; E05B 15/0205; E05F 3/224
See application file for complete search history.

(56) References Cited

U.S. PATENT DOCUMENTS

| | | | | |
|---|---|---|---|---|
| 4,132,439 | A * | 1/1979 | Millar | E05B 63/248 70/279.1 |
| 9,187,938 | B2 | 11/2015 | Pluta | |
| 2019/0024412 | A1 | 1/2019 | Lammers et al. | |
| 2021/0388640 | A1* | 12/2021 | Gell | E05B 47/0006 |

FOREIGN PATENT DOCUMENTS

| | | | | |
|---|---|---|---|---|
| DE | 102009056348 | A1 | 6/2011 | |
| EP | 3045622 | A1 * | 7/2016 | E05C 7/04 |
| EP | 3421695 | A1 | 1/2019 | |
| EP | 4159962 | A1 * | 4/2023 | E05B 65/02 |
| WO | WO-2021211071 | A1 * | 10/2021 | E05B 47/0004 |

OTHER PUBLICATIONS

European Search Report for EP Application No. EP23214079.8, dated Apr. 5, 2024, 6 pages.

* cited by examiner

MORTICED BOLT KEEP AND A CLOSURE SYSTEM COMPRISING THE SAME

CROSS-REFERENCE TO RELATED APPLICATION(S)

This present application claims priority to European Patent Application No. EP23214079.8, filed Dec. 4, 2023, the disclosure of which is hereby incorporated by reference in its entirety.

TECHNICAL FIELD

The present disclosure relates to a morticed bolt keep configured to cooperate with a lock having a latch bolt which is slidable between a retracted position and an extended position. The present disclosure further relates to closure system comprising a closure wing and a support with the morticed bolt keep mounted in the support.

BACKGROUND

EP 4 159 962 A1 discloses a morticed bolt keep comprising: an elongated body extending in a longitudinal direction and configured to be positioned inside a hollow tubular member which extends in the longitudinal direction; and a cavity inside the elongated body and configured to receive the latch bolt in its extended position. The morticed bolt keep is designed to receive the latch bolt in its extended position thereby keeping the closure wing on which the lock is mounted in the closed position. A user can unlatch the closure wing by actuating the lock thereby sliding the latch bolt from the morticed bolt keep.

A downside of this morticed bolt keep is that manual user intervention is required to unlatch the closure wing. In order to alleviate this problem, electrically operated bolt keeps are known. For example, EP 3 421 695 A1 discloses a surface mounted electric strike which allows a side wall of the bolt keep to pivot away thereby allowing exit of the latch bolt without needing to retract this. However, such a solution is not feasible for a morticed bolt keep as the side walls of the bolt keep are morticed into a support.

DE 10 2009 056 348 A1 discloses a morticed bolt keep for use in a conventional massive wing. The morticed bolt keep comprises: an elongated body extending in a longitudinal direction and configured to be positioned inside a closure wing; a cavity inside the elongated body and configured to receive the latch bolt in its extended position; a latch bolt engager mounted in the elongated body which is displaceable between a rest state and an actuated state; and a magnetic actuator mounted inside the elongated body and configured to displace the latch bolt engager from its rest state to its actuated state upon activation.

The magnetic actuator disclosed in DE 10 2009 056 348 A1 relies on a fixed coil surrounding an iron core. Upon activation of the coil, the iron core is withdrawn into the coil thereby actuating an L-shaped lever to tilt so that a roller provided on the free end of the L-shaped lever pushes the latch bolt outside the cavity thereby unlatching the latch bolt.

A main issue with the morticed bolt keep disclosed in DE 10 2009 056 348 A1 is its size. More particularly, the morticed bolt keep is not suited to be inserted in a hollow tubular member having only limited dimensions. Such hollow tubular members are common in outdoor applications (e.g. as part of a fence) and tend to have square or rectangular cross-sections with external dimensions of 4 cm, 5 cm or 6 cm (e.g. a rectangular cross-section of 3×6 cm or 4×6 cm). The morticed bolt keep disclosed in DE 10 2009 056 348 A1 is unlikely to fit into such a narrow space.

Another issue with this known morticed bolt keep is the force required to push the latch bolt. More specifically, locks used in outdoor applications tend to have a latch bolt which is pushed outwards with a higher force when compared to the latch bolt of indoor locks.

The throw of the latch bolt in outdoor application is also much longer when compared to indoor use. More specifically, a lock for outdoor use may have a throw exceeding 10 mm, e.g. 15 mm, whereas this is typically 2 to 4 mm in indoor applications. The main reason therefor is that a longer throw allows to compensate for misalignment (e.g. sagging, crooked, etc.) between the closure member and the support.

DE 10 2009 056 348 A1 further discloses a mechanical catch to keep the iron core in its withdrawn position. The mechanical catch more specifically engages a groove at the lower end of the iron core. Once the coil is deactivated by a circuit breaker, a return spring biases the L-shaped lever back to its rest position thereby disengaging the mechanical catch. In the context of outdoor use, the mechanical catch can lead to malfunctions of the bolt keep. More specifically, dirt, insects, misalignment in post/closure member spacing etc. can hamper the operation of the mechanical catch thereby increasing the force required to pull the iron core from the mechanical catch.

SUMMARY

It is an object of the present disclosure to at least partially alleviate one or more of the above-mentioned disadvantages.

A first aspect of the present disclosure is characterised in that the morticed bolt keep further comprises: a latch bolt engager mounted in the elongated body which is displaceable between a rest state and an actuated state; and a magnetic actuator mounted inside the elongated body and configured to displace the latch bolt engager from its rest state to its actuated state upon activation, the magnetic actuator comprising: a core which extends in the longitudinal direction and comprises at least one permanent magnet; and a coil assembly which extends in the longitudinal direction and comprises at least one coil, wherein one of the core and the coil assembly is slidable in the longitudinal direction and is operatively connected to the latch bolt engager.

As described further, in this first aspect, the core comprises at least two permanent magnets and/or the coil assembly comprises at least two coils. An embodiment comprising a single permanent magnet and a single coil is not intended to be part of this aspect.

By providing a magnetic actuator and latch bolt engager, the disadvantages of the morticed bolt keep disclosed in EP 4 159 962 A1 are overcome. More specifically, the magnetic actuator and latch bolt engager jointly enable the bolt keep to push the latch bolt from the keep thereby unlatching the closure wing.

The specific construction of the magnetic actuator, i.e. based on a longitudinally extending coil assembly and a longitudinally extending core, allows to place the bolt keep inside a hollow tubular member thereby overcoming one of the disadvantages of the morticed bolt keep disclosed in DE 10 2009 056 348 A1.

Furthermore, the use of at least one permanent magnet in the core of the magnetic actuator improves upon the iron core design disclosed in DE 10 2009 056 348 A1. The use of permanent magnet is a more energy-efficient design allowing higher forces over a long throw to be generated when activating the magnetic actuator. The morticed bolt keep according to the disclosure is thus ideally suited for outdoor use where higher forces over a long throw are required to push the latch bolt from the keep.

A second aspect of the present disclosure is characterised in that the morticed bolt keep further comprises: a latch bolt engager mounted inside the elongated body which is displaceable between a rest state and an actuated state; a magnetic actuator mounted inside the elongated body and configured to displace the latch bolt engager from its rest state to its actuated state upon activation; and an electromagnet mounted inside the elongated body and a magnetic catch fixed to the magnetic actuator, the electromagnet being configured to temporarily attract the magnetic catch to maintain the latch bolt engager in its actuated state.

The use of an electromagnet and magnetic catch allows to retain the latch bolt engager in its actuated state without requiring mechanical means as disclosed in DE 10 2009 056 348 A1. The disadvantages of such a mechanical catch are thus avoided.

Furthermore, this allows turning off the magnetic actuator once the electromagnet has been activated. This avoids overheating the magnetic actuator. The electromagnet also requires less power to maintain the latch bolt engager in its actuated state when compared to the power requirements of the magnetic actuator.

As used herein, the term "magnetic catch" is intended to refer to an element or part thereof which is attracted by an electromagnet, such as manufactured (in part) of a (soft) ferromagnetic or ferrimagnetic material.

An embodiment of the present disclosure is characterised in that the core comprises a frame comprising a first mounting space and a second mounting space separated by a frame part, wherein the first mounting space and the second mounting space are spaced apart from one another in the longitudinal direction by the frame part, wherein said at least one permanent magnet comprises a first permanent magnet mounted in the first mounting space and a second permanent magnet mounted in the second mounting space, the permanent magnets being oriented such that they repel one another in the longitudinal direction, and wherein the at least one coil is disposed at least around the frame part.

The force generated by the magnetic actuator is dependent on a number of factors, incl. the magnetic flux (density) generated by the permanent magnet through the coil(s) in the coil assembly. As such, a higher flux density is desired. By relying on two permanent magnets which repel one another, their magnetic field lines are compressed into a smaller volume thus increasing the magnetic flux density. The magnetic field lines are particularly compressed in the region of the frame part around which the coil is positioned.

An embodiment of the present disclosure is characterised in that each permanent magnet has a north pole and a south pole with a magnetic axis parallel to the longitudinal direction, wherein the first and second permanent magnets are oriented such that either their north poles or their south poles are facing one another in the longitudinal direction.

By positioning the magnetic axis parallel to the longitudinal direction (and preferably in line with one another), the generated Lorentz force is also in the longitudinal direction thus causing a sliding motion of either the core or the coil assembly. Such a sliding motion may be readily transferred to the latch bolt engager.

An embodiment of the present disclosure is characterised in that the frame comprises a third mounting space spaced apart from the second mounting space in the longitudinal direction by a further frame part, wherein the first mounting space and the third mounting space are on opposite sides of the second mounting space in the longitudinal direction, wherein said at least one permanent magnet comprises a third permanent magnet mounted in the third mounting space, the second and third permanent magnets being oriented such that they repel one another in the longitudinal direction, wherein said at least one coil comprises a first coil and a second coil, the first coil being disposed at least around the frame part and the second coil being disposed at least around the further frame part.

The additional of another permanent magnet and another coil increases the Lorentz force generated by the magnetic actuator.

An embodiment of the present disclosure is characterised in that the core comprises a frame comprising a first mounting space and a second mounting space separated by a frame part, wherein the first mounting space and the second mounting space are spaced apart from one another in the longitudinal direction by the frame part, wherein said at least one permanent magnet comprises a first permanent magnet mounted in the first mounting space and a second permanent magnet mounted in the second mounting space, the permanent magnets being oriented such that their magnetic axis are perpendicular to the longitudinal direction and such that they attract one another in the longitudinal direction, wherein said at least one coil comprises a first coil and a second coil.

The force generated by the magnetic actuator is dependent on a number of factors, incl. the amount of coil (e.g. the number of windings and/or the total wire length) which is exposed to a magnetic flux. The use of multiple coils thus increases the Lorentz force generated by the magnetic actuator.

An embodiment of the present disclosure is characterised in that the coils are disposed adjacent the frame on opposite sides thereof and have a same magnetic polarity.

In other words, each coil is coiled about a direction perpendicular to the longitudinal direction and is located on an opposite side of the core frame. This is a much simpler design when compared to inclined mutually parallel coils with an opposite magnetic polarity which could also function with mutually attracting permanent magnets.

An embodiment of the present disclosure is characterised in that said at least one permanent magnet has a north pole and a south pole with a magnetic axis parallel to the longitudinal direction, wherein said at least one coil comprises a first coil and a second coil separated from one another in the longitudinal direction, the first coil being disposed at least around the north pole and the second coil being disposed at least around the south pole, the coils having an opposite magnetic polarity.

The force generated by the magnetic actuator is dependent on a number of factors, incl. the amount of coil (e.g. the number of windings and/or the total wire length) which is exposed to a magnetic flux. The use of multiple coils thus increases the Lorentz force generated by the magnetic actuator.

An embodiment of the present disclosure is characterised in that each permanent magnet has a substantially constant cross sectional area viewed perpendicular to its magnetic axis, each permanent magnet particularly being a bar magnet.

This simplifies the design of the core frame and allows for a more convenient modelling of the magnetic actuator behaviour when compared to more exotic magnet shapes (e.g. a shoe magnet).

An embodiment of the present disclosure is characterised in that the magnetic actuator further comprises a magnetic shielding extending in the longitudinal direction and radially enclosing the coil assembly. Preferably, the magnetic shielding comprises a metal cylinder.

The use of a magnetic shielding radially enclosing the coil assembly causes a further focussing of the magnetic flux in the volume occupied by the coil assembly. This in turn increases the generated Lorentz force. Furthermore, the magnetic reluctance is herewith reduced which also positively affects the generated Lorentz force. A metal cylinder tends to be easily integrated into the morticed bolt keep design with minimal increase in size.

An embodiment of the present disclosure is characterised in that the core is slidable in the longitudinal direction and is operatively connected to the latch bolt engager.

The magnetic actuator is thus a Moving Magnet Actuator (MMA).

An embodiment of the present disclosure is characterised in that the core is operatively connected to the latch bolt engager by means of a rigid rod extending between a first end and a second end, wherein the first end is pivotable with respect to the core and the second end is pivotable with respect to the latch bolt engager, and wherein the rigid rod has a first smallest angle with respect to the longitudinal direction when the latch bolt engager is in its rest state and a second smallest angle with respect to the longitudinal direction when the latch bolt engager is in its actuated state, the second smallest angle being larger than the first smallest angle.

In a normal use, the bolt keep is designed to cooperate with a lock having a spring-biased latch bolt. The latch bolt is normally spring biased by a compression spring which is depressed when actuating the latch bolt engager. The more the latch bolt spring is compressed, the larger the force required. As such, the highest force is required near and at the actuated position of the latch bolt engager.

The use of a rigid tiltable rod allows more efficiently coupling the core to the latch bolt engager. More specifically, as compared to an equal arm length first order lever, the rigid rod has a higher efficiency near the end stroke of the core. For a same magnetic actuator force, the rigid rod can thus exert a larger force on the latch bolt engager than an equal arm length first order lever.

An embodiment of the present disclosure is characterised in that the rigid rod is connected to the elongated body by means of two guiding levers. This allows a near frictionless guiding of the rigid rod.

An embodiment of the present disclosure is characterised in that, in its rest state, the latch bolt engager is in a depressed position within the cavity and, in its actuated state, the latch bolt engager is in an extended position within the cavity, wherein the latch bolt engager is configured to push the latch bolt towards its retracted position when being displaced from its rest state to its actuated state.

In this embodiment, the morticed bolt keep is a fail close design. If there is no electricity, the latch bolt remains in the keep and the closure wing remains latched.

An embodiment of the present disclosure is characterised in that, in its rest state, the latch bolt engager is in an extended position within the cavity and, in its actuated state, the latch bolt engager is in a depressed position within the cavity, wherein the latch bolt engager is configured to allow the latch bolt to slide to its extended position into the cavity when being displaced from its rest state to its actuated state, wherein the morticed bolt keep preferably comprises a biasing member inside the elongated body which exerts a biasing force urging the latch bolt engager to its rest position, the magnetic actuator being configured to, upon activation, slide said one of the core and the coil in the longitudinal direction against said biasing force.

In this embodiment, the morticed bolt keep is a fail-open design. If there is no electricity, the latch bolt is kept outside the keep and the closure wing remains open. A biasing member is an elegant way of reversing the operation of the magnetic actuator thus allowing a substantially unchanged magnetic actuator to be used for both the fail-safe and fail-open morticed bolt keep.

An embodiment of the present disclosure is characterised in that the electromagnet comprises a fixed core which directly attracts the magnetic catch.

Whilst it is feasible to provide a moving core that is, for example, directly fixed to the magnetic catch, this tends to have an increased risk of material (e.g. dirt) accumulating inside the coil and negatively affecting the sliding motion of the moving core. A fixed core avoids this issue and dirt accumulating on the outside of the fixed core tends not to significantly deter from the operation of the magnetic catch.

An embodiment of the present disclosure is characterised in that, when the latch bolt engager is in its actuated state, the magnetic catch is in direct contact with the fixed core.

A direct contact between the fixed core and the magnetic catch creates a very strong connection and particularly much stronger than a similar setup where a slight air gap is present. The power required to maintain the magnetic catch attracted to the fixed core is thus much lower in a direct contact design compared to an air gap design.

An embodiment of the present disclosure is characterised in that the morticed bolt keep further comprises a magnetic shielding extending in the longitudinal direction interposed between the magnetic actuator and the electromagnet. Preferably, the magnetic catch comprises an L-shaped member having a first leg and a second leg, wherein the electromagnet is configured to temporarily attract the first leg of the magnetic catch, and wherein the second leg forms said magnetic shielding. Such magnetic shielding avoids interference of the magnetic actuator and the electromagnet.

In particular if the magnetic actuator relies on the use of one or more permanent magnets, these may unwantedly magnetize the (fixed) core of the electromagnet thereby preventing the magnetic catch from being released even when the electromagnet is no longer energized. Having the shielding as part of the magnetic catch (i.e. the L-shaped member) avoids having to provide a static shielding (i.e. a static element) between co-moving elements, namely the magnetic catch and the moving part of the magnetic actuator.

An embodiment of the present disclosure is characterised in that the morticed bolt keep comprises a control module configured to control the magnetic actuator and the electromagnet so that the electromagnet remains active for a period of time, for example 10 seconds, after the magnetic actuator has deactivated. Preferably, the control module is configured to either simultaneously activate the magnetic actuator and the electromagnet or to activate the electromagnet only after the magnetic actuator has been activated.

This ensures that the latch bolt engager (and thus the latch bolt of the lock) remains in the desired position for a sufficient amount of time to allow a user to open the closure wing. Activating the electromagnet only after the magnetic actuator reduces total power consumption, but requires an additional delay to be implemented which may be cumbersome.

The time for which the magnetic actuator and the electromagnet remain active may be pre-set or programmable in a memory of the control module. Alternatively, this time may be externally controlled through a remote controller interacting with the control module.

An embodiment of the present disclosure is characterised in that the electromagnet requires a lower power to maintain the latch bolt engager in its actuated state when compared to a power required by the magnetic actuator to displace the latch bolt engager towards its actuated state.

In this way, the latch bolt engager (and thus the latch bolt of the lock) remains in the desired position with a reduced power consumption due to the presence of the electromagnet over the total period of time when compared to a bolt keep which relies solely on the magnetic actuator to keep the latch bolt engager in the desired position for that same time period. Moreover, this may also prevent overheating of the magnetic actuator that may occur when having to keep this active for extended periods of time (e.g. 10 seconds).

An embodiment of the present disclosure is characterised in that the electromagnet is configured to temporarily maintain the magnetic actuator in its actuated state against a force of at least 5 N urging the magnetic actuator to its rest state.

This ensures that the morticed bolt keep can keep the latch bolt engager in its actuated state even against a latch bolt (or other element) exerting a force of up to 5 N thereon. Such forces tend to occur in locks for outdoor applications.

An embodiment of the present disclosure is characterised in that the magnetic actuator comprises a longitudinally extending core which is slidable in the longitudinal direction and operatively connected to the latch bolt engager, the magnetic catch being attached to the core.

The magnetic actuator is thus a Moving Magnet Actuator (MMA). The magnetic catch is attached to the core and thus ensures that the core (and through this the latch bolt engager) is kept in the actuated state. No other intermediate elements need be present between the core and the magnetic catch thus avoiding potential force losses.

The object according to the present disclosure is also achieved with a closure system comprising a closure wing and a support, the closure wing being provided with a lock having a latch bolt which is slidable between a retracted position and an extended position, the support extending in a longitudinal direction and comprising a hollow tubular member, wherein the closure system further comprises a morticed bolt keep as described above mounted in the hollow tubular member.

The closure system includes the morticed bolt keep as described above and thus achieves the same advantages.

BRIEF DESCRIPTION OF THE DRAWINGS

Other particularities and advantages of the disclosure will become apparent from the following description of some particular embodiments of a mortice lock and of a keep according to the present disclosure. The reference numerals used in this description relate to the annexed drawing.

DETAILED DESCRIPTION

Figure 1A:
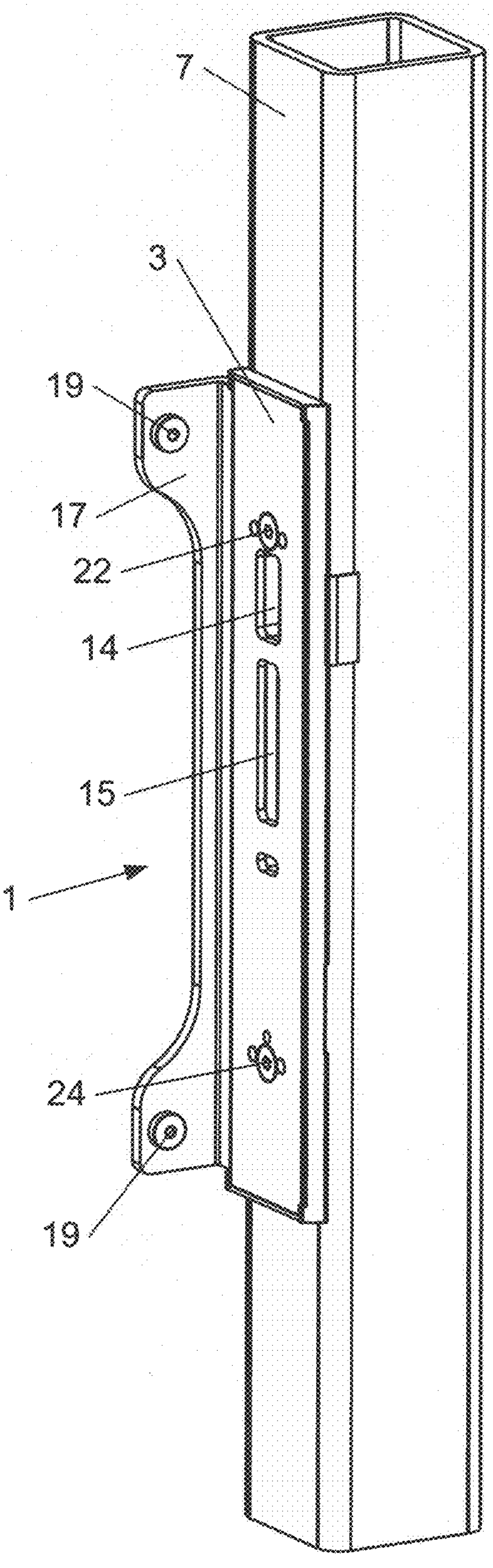
FIGS. 1A and 1B show perspective views of a fail-safe morticed bolt keep according to the present disclosure mounted on a hollow tubular member with the latch bolt engager in its rest position.
Figure 1B:
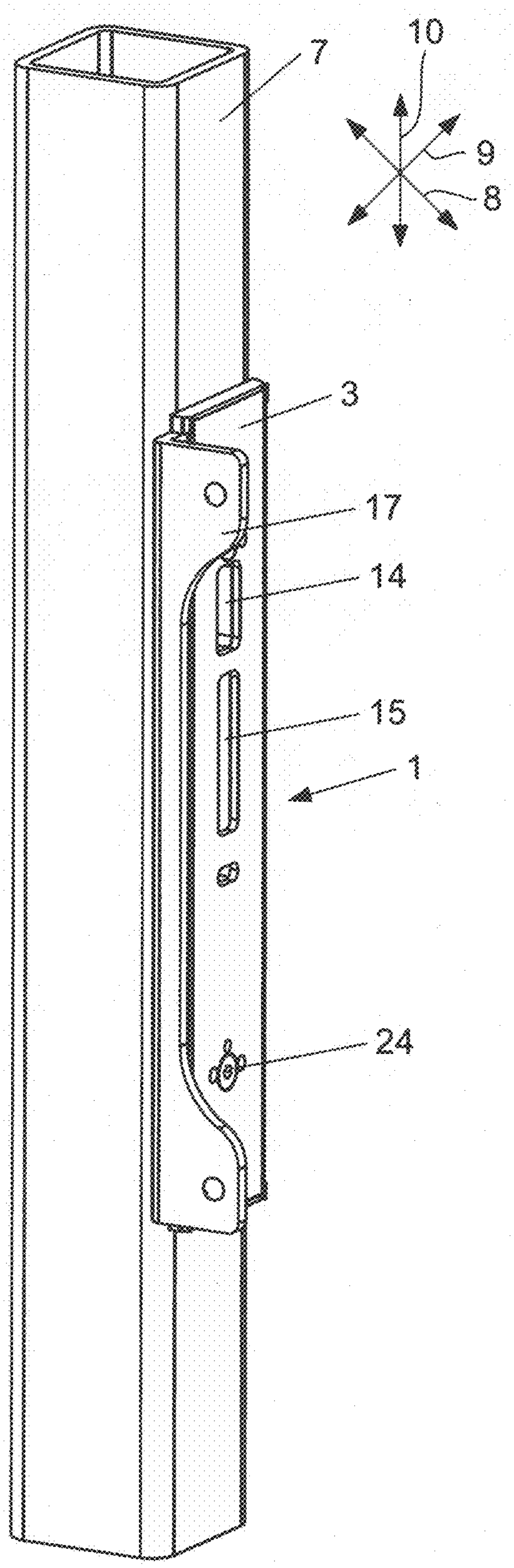

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

The present disclosure generally relates to a morticed bolt keep 1 which comprises a faceplate 3 and an elongated body 5. The elongated body 5 is designed to be inserted into a hollow tubular member 7 which can be either be a fixed support or a leaf (also termed closure wing) of a double winged closure system. The tubular member 7 extends in a longitudinal direction 10. Other relevant directions are the depth direction 9 and the width direction 8 which together determine a horizontal plane. The depth direction 9 is the direction in which the closure wing pivotally opens/closes with respect to the hollow tubular member 7. The directions 8, 9, 10 are mutually orthogonal.

The hollow tubular member 7 is common in outdoor applications (e.g. as part of a fence) and usually has square or rectangular cross-sections with external dimensions of 4 cm, 5 cm or 6 cm (e.g. a rectangular cross-section of 3×6 cm or 4×6 cm). In the illustrated embodiment, the tubular member 7 has a rectangular cross-section with outer dimensions of 4×6 cm. In the context of the present disclosure, mainly the depth of the hollow tubular member 7 is important and is preferably at least 5 cm so that the outer depth dimension of the hollow tubular member 7 is usually about 6 cm. Deeper hollow tubular members are also uncommon in normal outdoor applications.

Figure 3A:
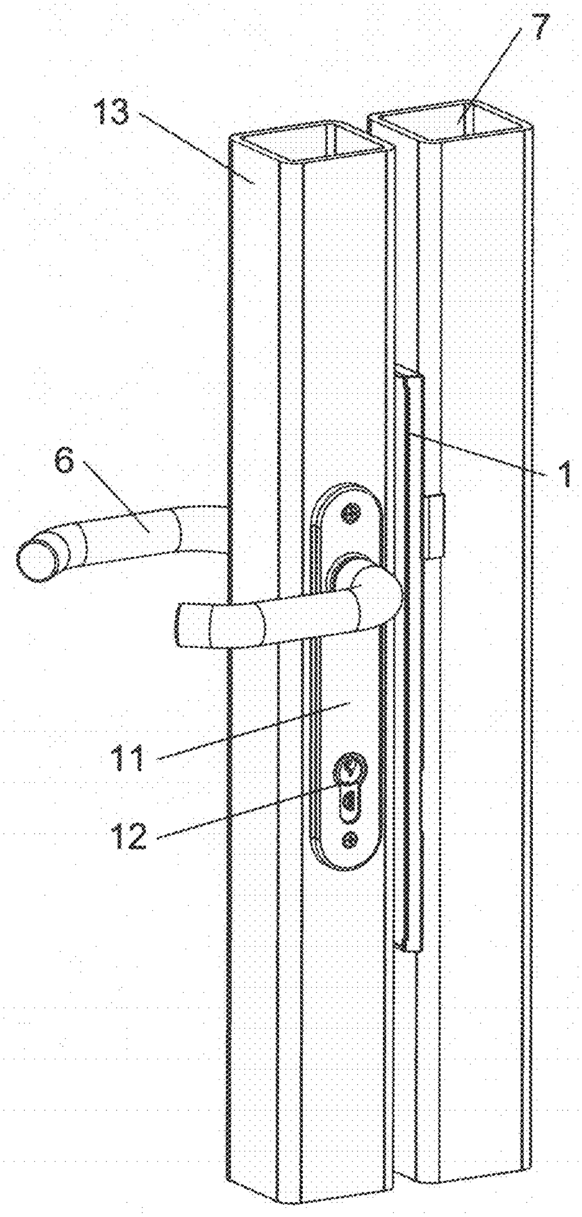
FIGS. 3A and 3B show perspective views of a closure system comprising a morticed bolt keep according to the present disclosure.
Figure 3B:
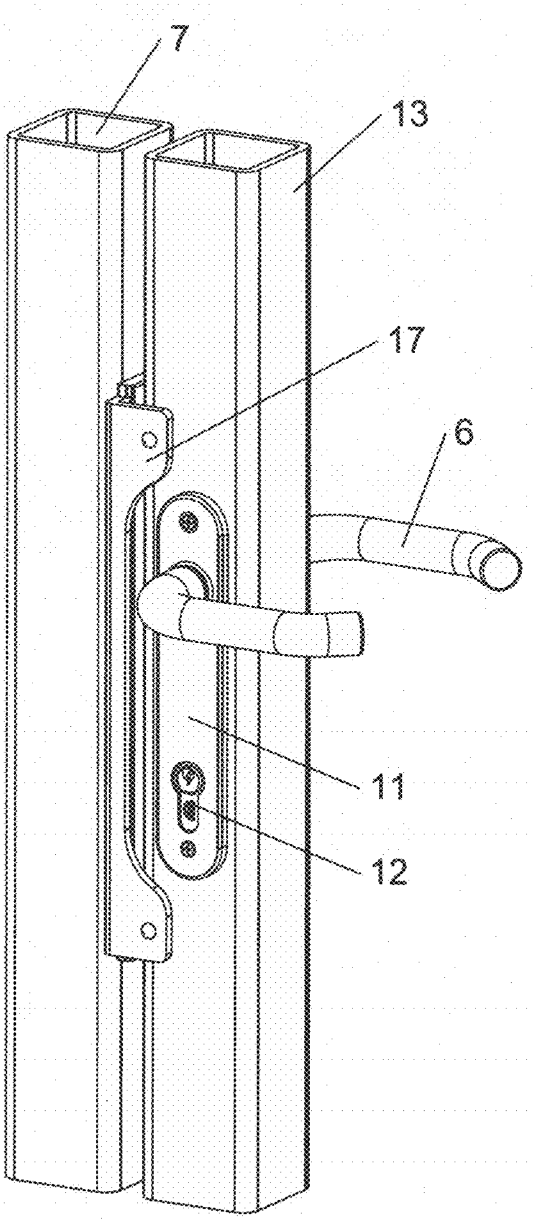

The morticed bolt keep 1 is designed for cooperation with a lock 11 as shown in FIGS. 3A and 3B. The illustrated lock 11 is morticed into a hollow tubular member 13 of a closure wing. Examples of such locks are disclosed in EP 2 186 974, EP 3 153 645, and EP 4 159 962 A1 and further details can be found therein. The disclosure is however not limited to a morticed lock and surface-mounted locks, for example as disclosed in EP 1 118 739 A1, EP 2 915 939 A1, and EP 4 191 007 A1, may also be used.

The morticed bolt keep 1 is designed for cooperation with a lock 11 comprising a latch bolt (not shown) which is slidably (in the width direction 8) mounted in the lock 11 to slide between a retracted and an extended position. The latch bolt is, in the illustrated embodiment, operated by means of handles 6. However, other operation mechanisms are known. The illustrated lock further comprises a deadbolt (not shown) which is operated by means of a lock cylinder 12, for example a single-barrel euro-profile cylinder.

The morticed bolt keep 1 comprises a faceplate 3 and a partially hollow body 5. The faceplate 3 comprises a latch bolt receiving opening 14 in which the latch bolt is received when extended. The faceplate 3 also comprises a deadbolt receiving opening 15 in which the deadbolt is received when extended.

Figure 4:
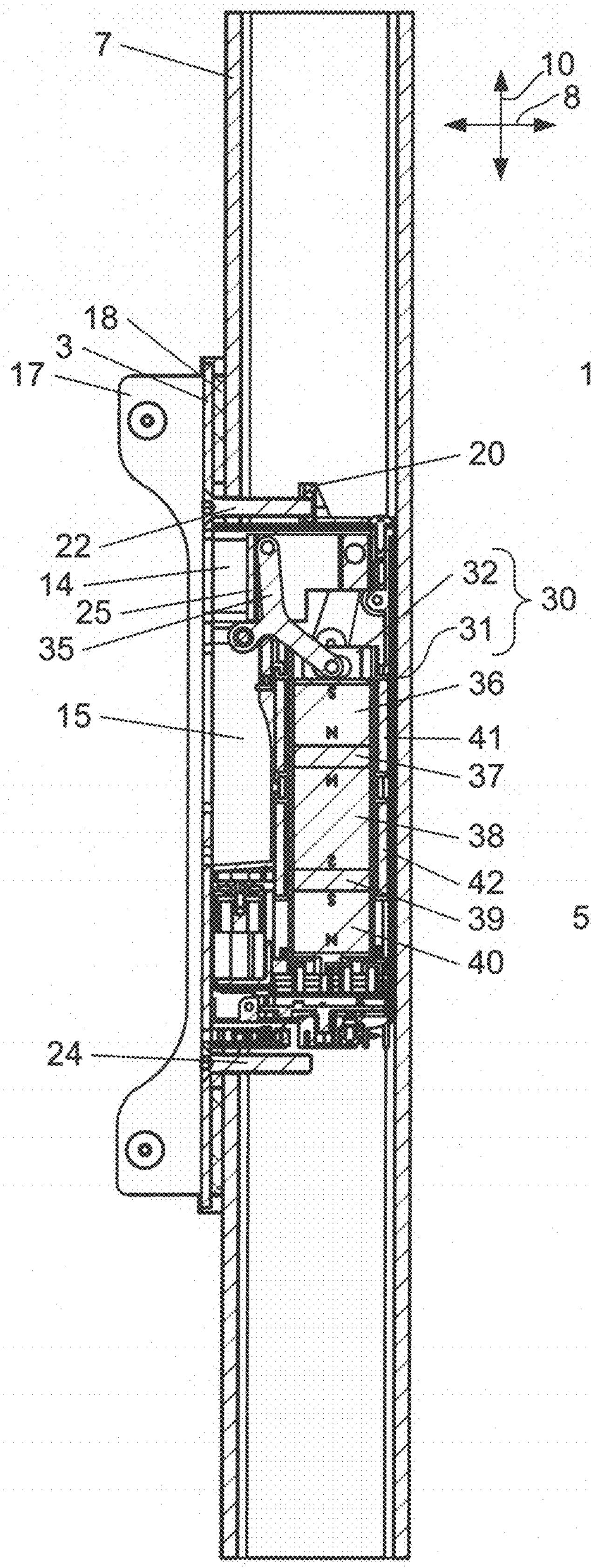
FIG. 4 shows a longitudinal cross-section through the morticed bolt keep of FIGS. 1A to 2B with the latch bolt engager in its rest position.
Figure 5:
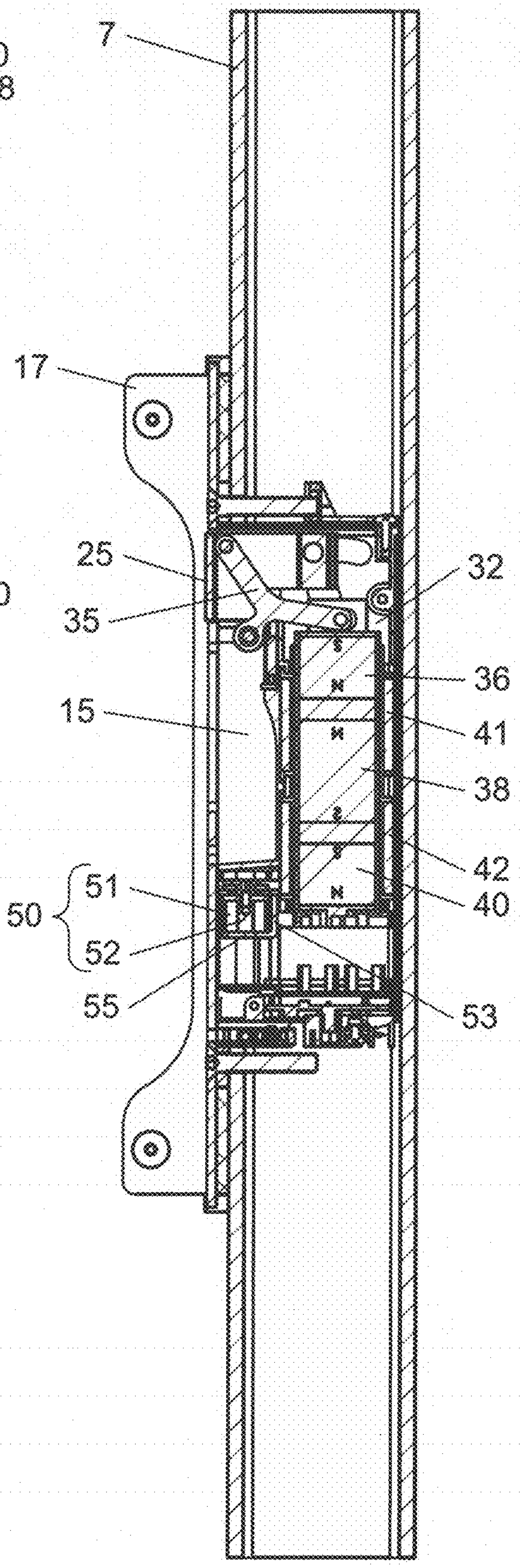
FIG. 5 shows a longitudinal cross-section through the morticed bolt keep of FIGS. 1A to 2B with the latch bolt engager in its actuated position.

In the illustrated embodiments, the morticed bolt keep 1 further comprises a stop 17 which acts to stop a movement of the closure wing 13. The stop 17 is provided with bumpers 19 reducing noise and/or preventing damage to the closure wing. The stop 17 is generally part of an L-shaped member having a first leg forming the stop and a second leg 18 positioned between the faceplate 3 and the support 7 as shown in FIGS. 4 and 5. A shortest distance between the stop 17 and the latch bolt receiving opening 14 (which is measured in the depth direction 9) may be adjustable to account for different closure wings 13. Such adjustment means are disclosed in EP 1 600 584 A1 and EP 3 239 440 A1 and will not be described further.

The faceplate 1 comprises two openings (not shown), i.e. one on either side of the bolt receiving openings 14, 15, which are used to mount the morticed bolt keep 1 to the hollow tubular member 7. In the illustrated embodiment, the morticed bolt keep 1 is mounted inside a hollow tubular member as disclosed in EP 4 159 962 A1, EP 4 245 950 A1, and EP 4 245 951 A1. The various mounting means disclosed in EP 4 159 962 A1 and in EP 4 245 951 A1 may thus be used in the context of the present disclosure as well.

Details regarding how the morticed bolt keep 1 is mounted inside the hollow tubular member 7 are shown in FIGS. 4 and 5. To this end, the hollow tubular member 7 comprises an elongated slot (not shown) with semi-circular notches at the top/bottom end of this elongated slot. The elongated body 5 of the bolt keep 1 is provided with a slidable fixation member 20 on the upper end of the body 5. The slidable fixation member 20 is slidable in the width direction 8 with respect to the body 5. The fixation member 20 has a bolt receiving opening for receiving a bolt 22 (or other generic fixation means). When tightening the bolt 22, the slidable fixation member 20 is slid until it engages the inner wall of the hollow tubular member 7. The lower end of the body 5 is not fixed to the hollow tubular member 7 but is nonetheless correctly positioned by means of bolt 24 (or other generic fixation means) that is positioned through the faceplate 3 and the semi-circular notch (not shown) provided in the hollow support member 7. This specific mounting mechanism allows inserting the body 5 into the hollow member 7 by tilting the body 5 so that the slidable fixation member 20 is inside the hollow member 7 and afterwards aligning the body 5 with the elongated slot in the hollow member 7 so as to slide the entire body 5 deeper into the hollow member 7 so that the faceplate 3 abuts the outer wall of the hollow member 7. The bolts 22, 24 are finally inserted and the slidable fixation member 20 is tightened against the inner wall of the hollow tubular member 7.

Figure 2A:
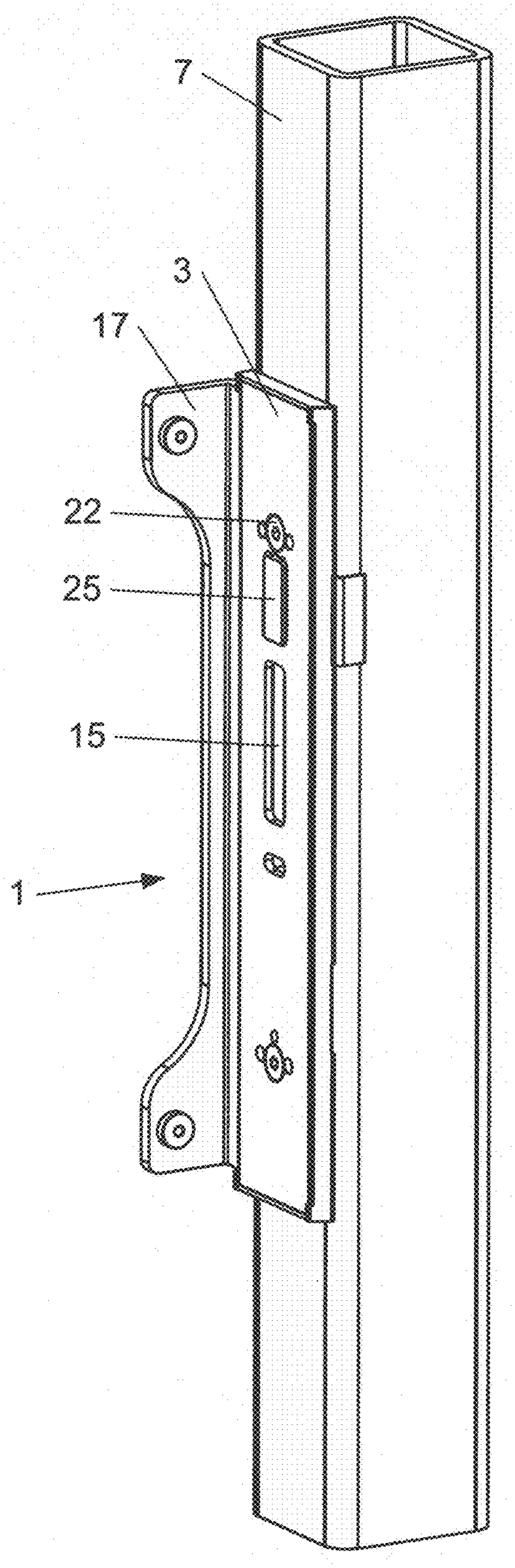
FIGS. 2A and 2B show similar perspective views as FIGS. 1A and 1B with the latch bolt engager in its actuated position.
Figure 2B:
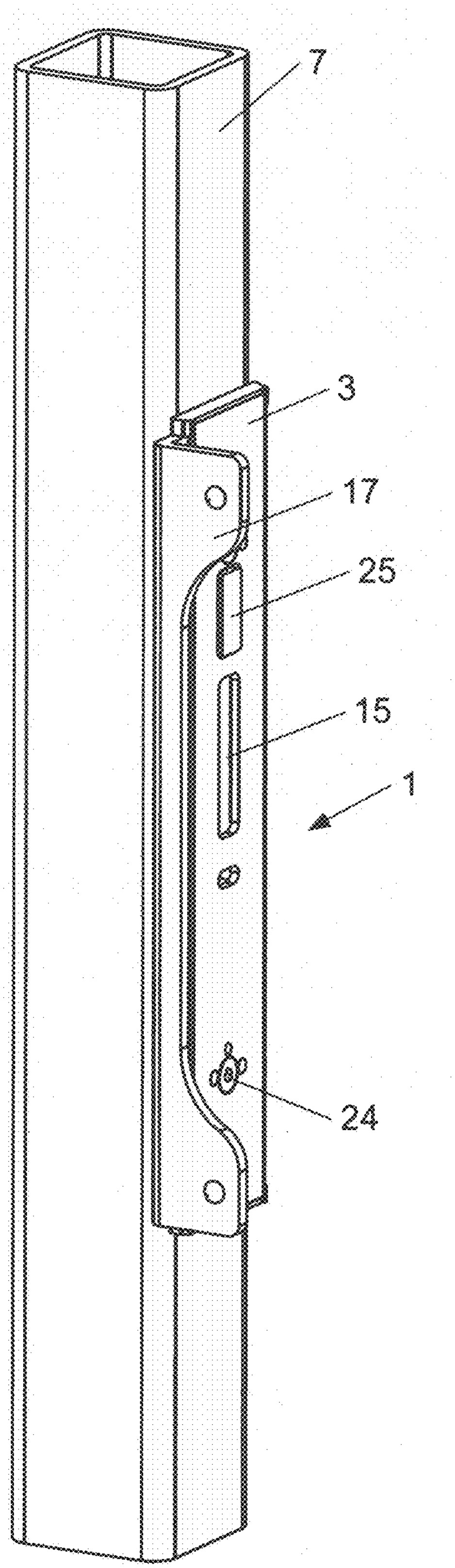

As shown in FIGS. 2A and 2B, the morticed bolt keep 1 is provided with a latch bolt engager 25 positioned inside the latch bolt receiving opening 14. The latch bolt engager 25 is designed to, upon activation of the magnetic actuator inside the morticed bolt keep 1, push the latch bolt out of the latch bolt receiving opening 14 without requiring a user to actuate the latch bolt using the handles 6. Details of the internal construction of the morticed bolt keep 1 is described below with respect to FIGS. 4 and 5.

The morticed bolt keep 1 according to the present disclosure comprises a magnetic actuator 30 which generally comprises a coil assembly 31 and a core assembly 32 which both extend in the longitudinal direction 10. In the illustrated embodiment, the magnetic actuator 30 is based on the principle of Moving Magnet Actuators (MMA) meaning that the coil assembly 31 is stationary within the elongated body 5 whereas the core assembly 32 is slidable in the longitudinal direction 10. The core assembly 32 is connected by a lever 35 to the latch bolt engager 25, which lever 35 thus transfers a sliding motion of the core 32 in the longitudinal direction 10 to a sliding motion of the latch bolt engage 25 in the width direction 8.

In an alternative embodiment, the magnetic actuator is based on the principle of Moving Coil Actuators (MCA) meaning that the core assembly is stationary within the elongated body whereas the coil assembly is slidable in the longitudinal direction 10. Both principles may be used in the context of the present disclosure. However, the MMA principle is preferred as the core assembly is a standalone component whereas the coil assembly must by physically connected to a power source so that moving the coil assembly as required in the MCA principle is complex.

Figure 9A:
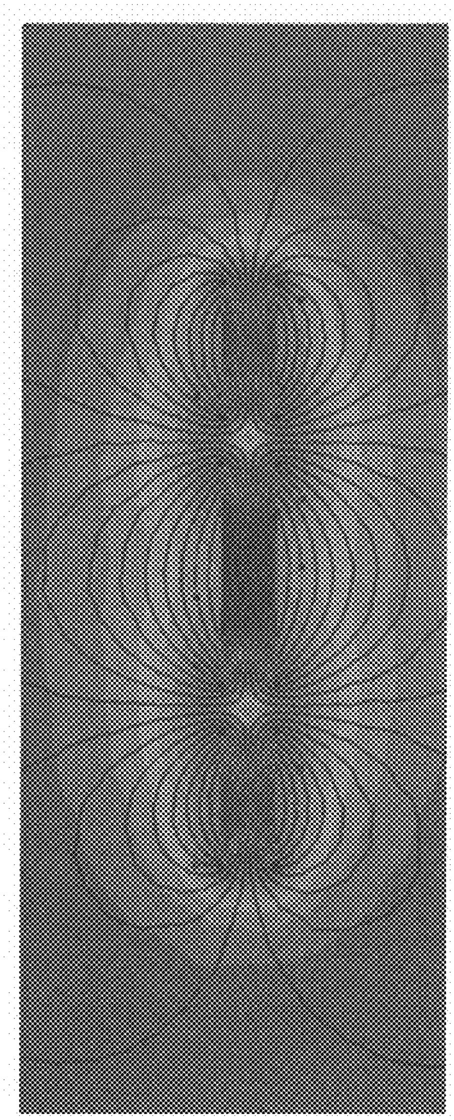
FIGS. 9A and 9B show magnetic field configurations of different magnet actuators for a morticed bolt keep according to the present disclosure.

In the embodiment illustrated in FIGS. 4 and 5, the core assembly 32 comprises three permanent magnets separated by core elements. More specifically, when viewed in the longitudinal direction 10, there is an upper magnet 36, an upper core element 37, a middle magnet 38, a lower core element 39, and a lower magnet 40. Each magnet 36, 38, 40 is oriented with its magnetic axis parallel to the longitudinal direction 10. In the illustrated embodiment, each magnetic axis is actually coinciding. The magnets 36, 38, 40 are oriented such that the middle magnet 38 repels the upper and lower magnets 36, 40. The core assembly 32 naturally comprises a frame holding these magnets 36, 38, 40 in a static position with respect to one another. The magnetic field created by the core assembly 32 is visualized in FIG. 9A and confirms, as described above, that the repelling magnets create a magnetic flux concentration around the core elements 37, 39. In the embodiment illustrated in FIGS. 4 and 5, the coil assembly 31 comprises two coils, namely an upper coil 41 surrounding the upper core element 37 and a lower coil 42 surrounding the lower core element 39. Each coil 41, 42 is coiled around the longitudinal direction 10 and has a same magnetic polarity. It will be readily appreciated that the same principle may be used in a two-magnet setup with a single coil.

In general, the force generated by a magnet actuator is the Lorentz force F, which is theoretically given by F=nIBl, where n is the number of revolutions (or windings) by the current carrying conductor subjected to the magnetic field, I is the current in the conductor, B is the flux density of the magnetic field (note that only perpendicular part of the magnetic field perpendicular to the coil is relevant), and l is the length of the current carrying conductor subjected to the magnetic field. The direction of the Lorentz force depends on the magnetic field orientation (dependent on the core assembly 32) and the magnetic polarity (dependent on the coil assembly 31) which is influenced by the coil handedness and the current direction.

In the illustrated embodiment, the generated Lorentz force F has a magnitude of about 20 N. This ensures that the morticed bolt keep 1 is suitable to be used with the locks commercially available by the present Applicant which may have a latch bolt biased towards its extended position by a biasing force of up to 15 N.

A further detail of the morticed bolt keep 1 is the height extension of the magnets 36, 38, 40 and the coils 41, 42 viewed in the longitudinal direction 10. More specifically, the middle magnet 38 is purposefully higher than the outer magnets 36, 40. Firstly, this is done in order to maximize the total coil height in the longitudinal direction in view of the total height available which is limited by the elongated slot provided in the hollow tubular member 7. Secondly, due to the moving core, once a permanent magnet moves too much with respect to a static coil its opposite magnetic pole enters the coil area thus decreasing the generated Lorentz force. This may illustrated by comparing the position of the middle magnet 38 and the upper coil 41 in FIGS. 4 and 5. In FIG. 4, the middle magnet 38 is nearly wholly beneath the upper coil 41. When moving upwards, only the upper half (i.e. the north pole) of the middle magnet 38 enters the upper coil 41 thus maximizing the generated Lorentz force. If the middle magnet 38 moves up higher, then the lower half (i.e. the south pole) would also enter the upper coil 41 thereby creating a counteracting Lorentz force. As such, if a shorter middle magnet would be used, a counteracting Lorentz force would be created. Ideally, the lower magnet 40 would also be longer to avoid the north pole of entering the lower coil 42. However, there was not sufficient space to allow this.

FIGS. 4 and 5 further illustrate that the morticed bolt keep 1 comprises an electromagnet 50 to attract a magnetic catch 55. The electromagnet 50 has a fixed core 52 surrounded by a coil 51. The magnetic catch 55 is fixed to and thus slidable with the core assembly 32 when activating the magnetic actuator 30. In the actuated state of the magnetic actuator 30 (i.e. when the latch bolt engager 25 is extended in the embodiment shown in FIGS. 4 and 5), the magnetic catch 55 is directly contacting the fixed core 52.

The electromagnet 50 is designed to take over the role of the magnetic actuator 30 once the core assembly 32 has reached its actuated state (i.e. the upwards position shown in FIG. 5). More specifically, the electromagnet 50, once activated, causes the magnetic catch 55 to be stuck to the fixed core 52 thereby maintaining the core assembly 32 (and the latch bolt engager 25) in its actuated state. This allows the magnetic actuator 30 to be turned off. This is advantageous to avoid overheating the magnetic actuator 30. Furthermore, due to the direct contact between the fixed core 52 and the magnetic catch 55, the electromagnet 50 requires less power to maintaining the core assembly 32 (and the latch bolt engager 25) in its actuated state when compared to the power requirements of the magnetic actuator 30.

In the illustrated embodiment, a magnetic shielding 53 is also provided between the electromagnet 50 and the magnetic actuator 30. This shielding 53 prevents that the fixed core 52 would be magnetized due to the permanent magnets 36, 38, 40 thus causing the magnetic catch 55 to remain stuck to the fixed core 52 even after deactivating the electromagnet 50. As shown in FIGS. 4 and 5, the magnetic shielding 53 is jointly made with the magnetic catch 55 as part of an L-shaped member. This is feasible since the shielding 53 is only needed when the core assembly 32 has reached its actuated state. The magnetic shielding 53 is typically made of a ferromagnetic material (e.g. iron) with a high magnetic susceptibility to attract magnetic field lines from the lower magnet 40 thereby shielding the electromagnet 50.

A further measure to avoid (or reduce) interference of the permanent magnets in the magnetic actuator 30 on the electromagnet 50 is to position the electromagnet 50 to the side of the magnetic actuator 30 as in the illustrated embodiments. If, on the other hand, the electromagnet 50 would be positioned directly above or below the magnetic actuator 30, this tends to magnetize the fixed core 52 thus causing the magnetic catch 55 to remain stuck to the fixed core 52 even after deactivating the electromagnet 50. The sidewards placement is further useful to limit the height required.

A suitable controller (not shown) is provided in the morticed bolt keep 1 to control the operation thereof. The controller is generally a computer system comprising a bus, a processor, a local memory, one or more input/output (I/O) interfaces, and/or a communications interface. The bus comprises one or more multiple conductors and allows communication between the different components of the computer system. Processor comprises any type of conventional processor or microprocessor that reads and executes computer program instructions. Local memory is intended to comprise any form of computer-readable information storage medium, such as a working memory (e.g., Random Access Memory—RAM), a static memory (e.g., a Read-Only Memory—ROM), a hard drive, or removable storage media (e.g. a DVD, CD, USB storage, SSD, etc.), etc. The local memory typically serves to store information and instructions to be processed by the processor. The I/O interface may comprise one or more conventional systems that enable communication between the controller and a user. Examples comprise a keyboard, a mouse, speech recognition, biometrics, a (touch) screen, a printer, a speaker, etc. The communication interface is typically a transceiver system that allows communication with external systems. Examples are a Wide Area Network (WAN), such as the Internet, a Low Power Wide Area Network (LPWAN) such as Sigfox, LoRa, NarrowBand IoT, etc., a Personal Area Network (PAN) such as Bluetooth, or a Local Area Network (LAN). The controller controls the operation (e.g. active duration, time of activation, etc.) of the magnetic actuator 30 and the electromagnet 50.

The embodiment illustrated in FIGS. 4 and 5 is a fail close morticed bolt keep 1. More specifically, when no power is supplied to the coil assembly 31, the core assembly 32 is in its downwards position and the latch bolt engager 25 is withdrawn into the latch bolt receiving opening 14 (as shown in FIG. 4). This position may be achieved, for example, due to gravity, due to a latch bolt pushing on the latch bolt engager 25, etc. If power is supplied to the coil assembly 31 (i.e. when a current is circulated in the coils 41, 42), an upwards Lorentz force is generated and exerted on the core assembly 32 thereby sliding the core assembly 32 upwards and moving the latch bolt engager 25 towards its extended position (shown in FIG. 5) thereby pushing the latch bolt from the latch bolt receiving opening 14.

Figure 6:
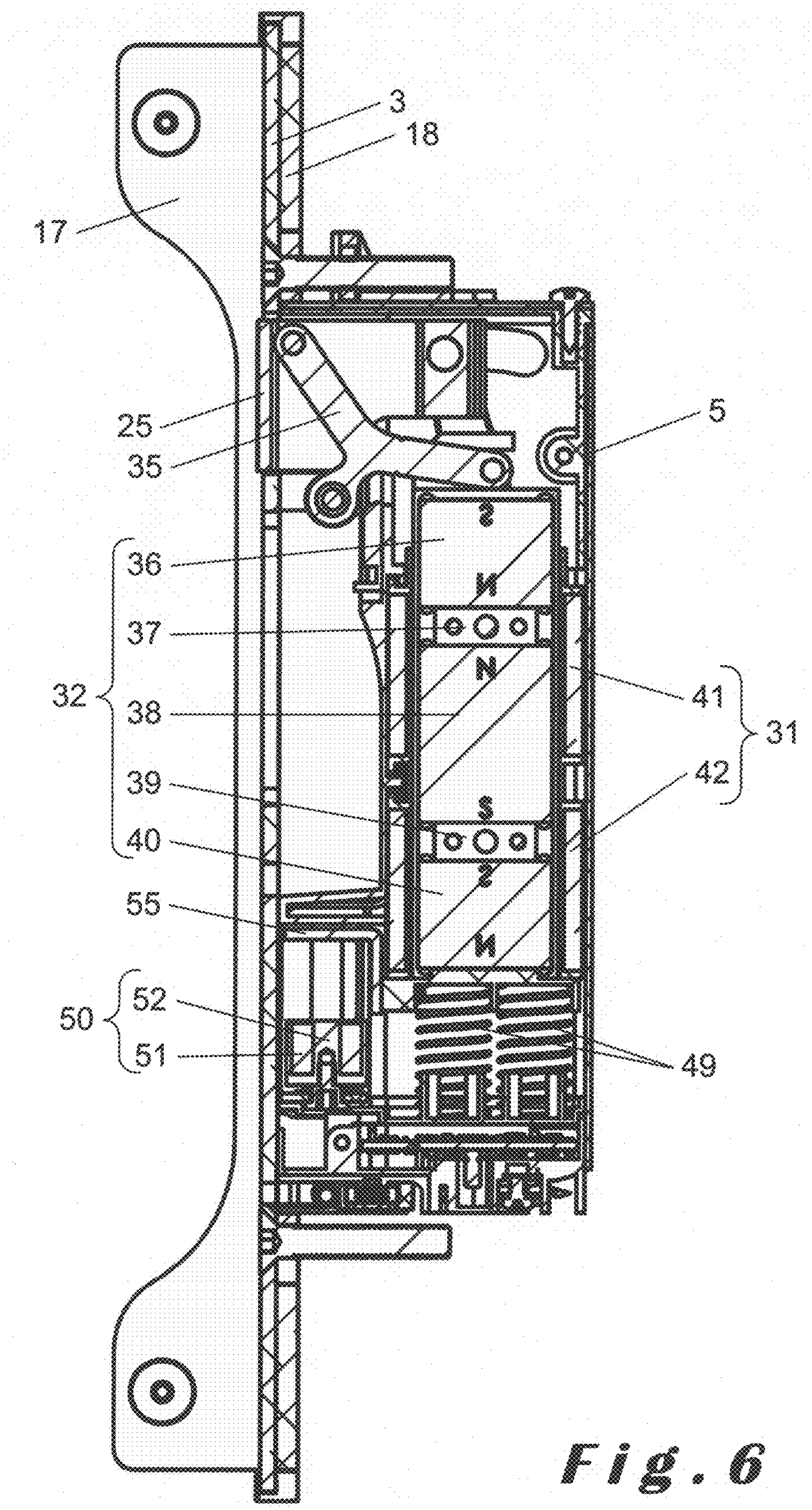
FIG. 6 shows a longitudinal cross-section through a fail-open morticed bolt keep according to the present disclosure with the latch bolt engager in its rest position.
Figure 7:
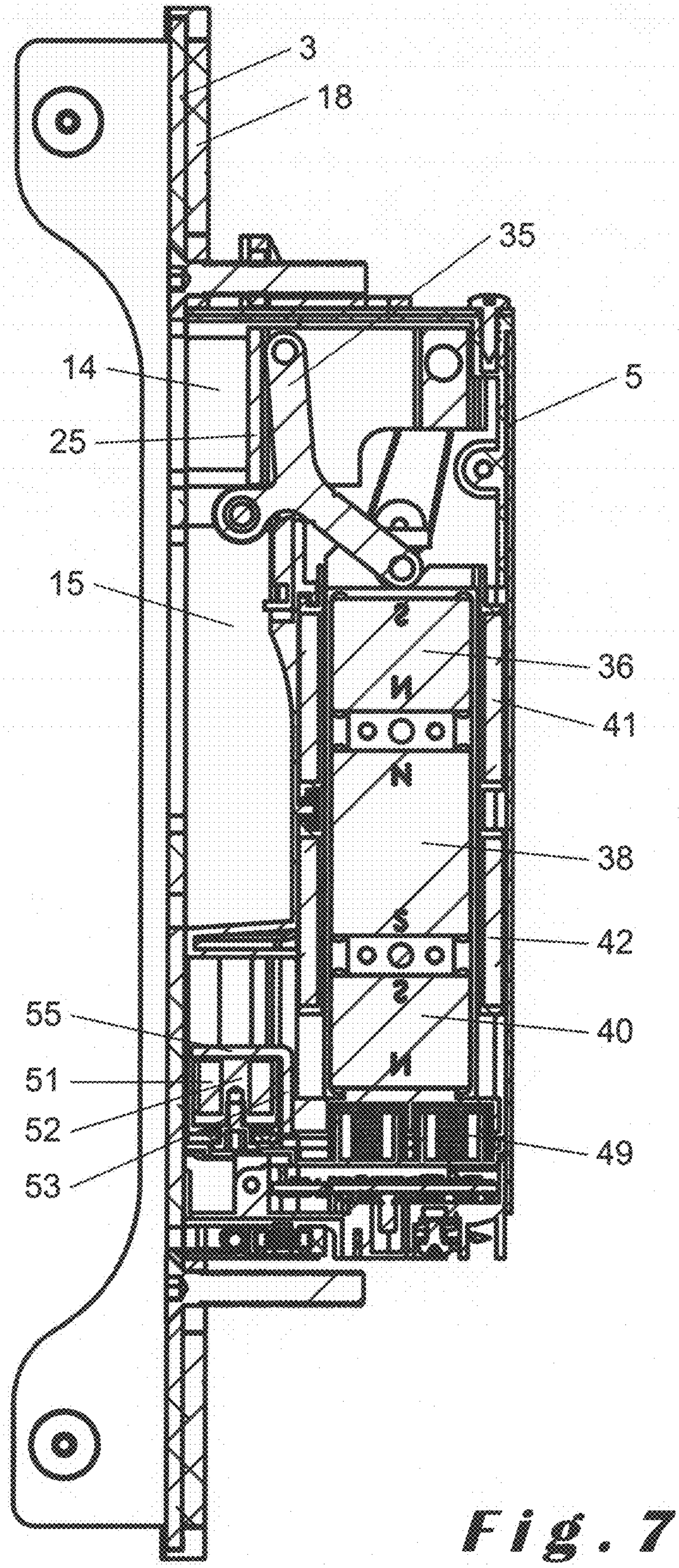
FIG. 7 shows a longitudinal cross-section through the fail-open morticed bolt keep according to the present disclosure with the latch bolt engager in its actuated position.

The morticed bolt keep 1 illustrated in FIGS. 6 and 7 is similar to the morticed bolt keep 1 described above. The main difference is that the morticed bolt keep 1 illustrated in FIGS. 6 and 7 is a fail-open morticed bolt keep 1. To achieve this, two compression springs 49 (or other generic biasing means) are provided. These springs 49 bias the core 32 upwards and maintain the latch bolt engager 25 in its extended position (shown in FIG. 6). The springs 49 are sufficiently strong so as to keep the latch bolt engager 25 towards its extended position even when a latch bolt is pushing thereon. The other revision in the fail-open morticed bolt keep 1 is that the generated Lorentz force has an opposite direction. This may be achieved in various ways, e.g. reversing the orientation of the permanent magnets 36, 38, 40, shifting the coils 41, 42 with respect to core parts 37, 39, etc. If power is supplied to the coil assembly 31 (i.e. when a current is circulated in the coils 41, 42), a downwards Lorentz force is generated and exerted on the core assembly 32 thereby sliding the core assembly 32 downwards and moving the latch bolt engager 25 towards its withdrawn position (shown in FIG. 7) thereby allowing the latch bolt to enter the latch bolt receiving opening 14.

The lever 35 interposed between the core assembly 32 and the latch bolt engager 25 is, in the illustrated embodiment, a first order lever with substantially equal arms. As such, there is no force reduction or amplification between the core assembly 32 and the latch bolt engager 25.

Figure 10A:
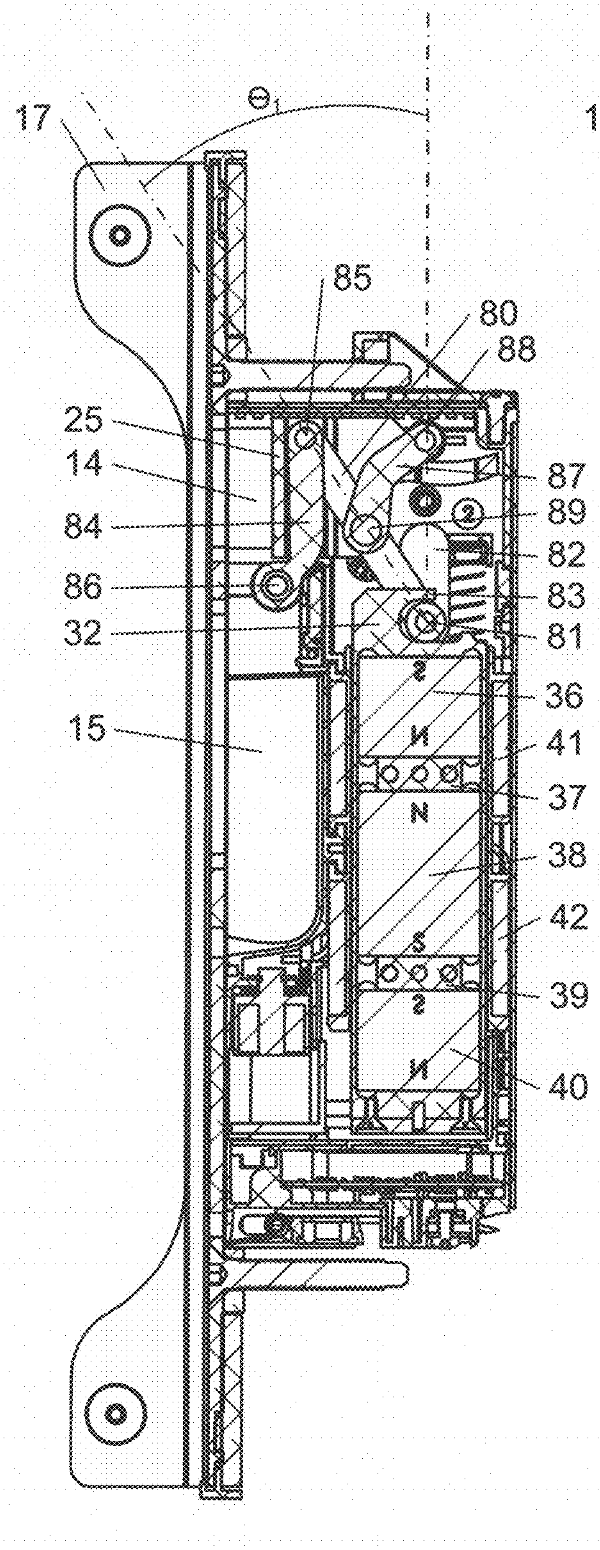
FIGS. 10A and 10B show a longitudinal cross-section through another embodiment of a morticed bolt keep with the latch bolt engager in its rest position and its actuated position respectively.
Figure 10B:
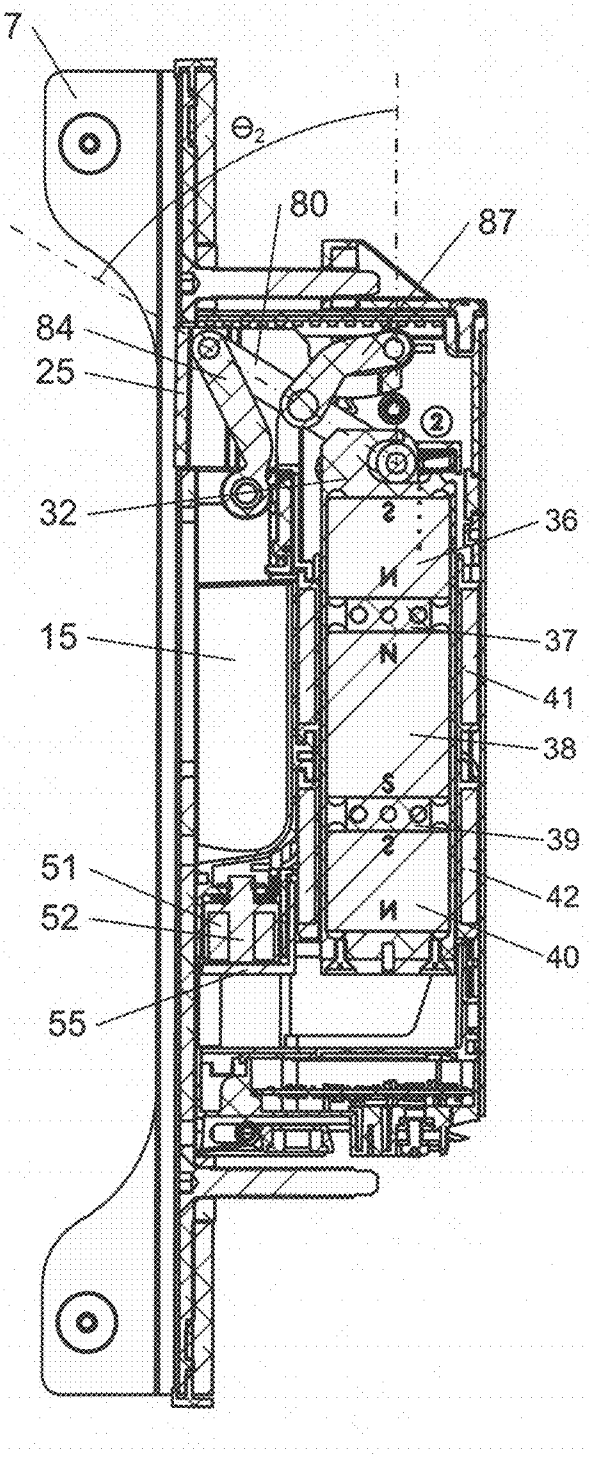

An alternative coupling between the core assembly 32 and the latch bolt engager 25 is shown in FIGS. 10A and 10B. This coupling comprises a rigid rod 80 extending between a first end and a second end. The first end is pivotably fixed to the core assembly 32 by means of a first axle 81. This axle 81 is guided in an elongated slot 82 which extends in the vertical direction 10. The core assembly frame has a protruding part 83 in which the axle 81 partially extends. In this manner, the first end of the rigid rod 80 is vertically displaceable jointly with the core assembly 32.

The second end of the rigid rod 80 engages the latch bolt engager 25. This second end is connected to a pivotable lever 84 by means of a second axle 85. The pivotable lever 84 is connected to the elongated body 5 by a third axle 86. In an embodiment, the axle 85 could be fixed to the latch bolt engager 25 as well. A further guiding lever 87 is provided which interconnects the body 5 to the rigid rod 80 by means of two axles 88, 89. Due to the presence of the two levers 84, 87, a sliding motion of the core assembly 32 causes a pivoting motion of the rigid rod 80 so that its second end slides in the width direction 8 thereby pushing the latch bolt engager 25 outwards.

As indicated in FIGS. 10A and 10B. When the latch bolt engager 25 is in its rest position, the rigid rod 80 has a smallest angle $\theta_1$ with respect to the elongated direction 10 and when the latch bolt engager 25 is in its actuated position, the rigid rod 80 has a smallest angle $\theta_2$ with respect to the elongated direction 10. The angle $\theta_2$ is larger than the angle $\theta_1$ which causes an increased efficiency of the coupling the nearer the latch bolt engager 25 is to its actuated position.

The use of the two guiding levers 84, 87 allow to guide the rigid rod 80 displacement in a near frictionless manner.

Figure 8:
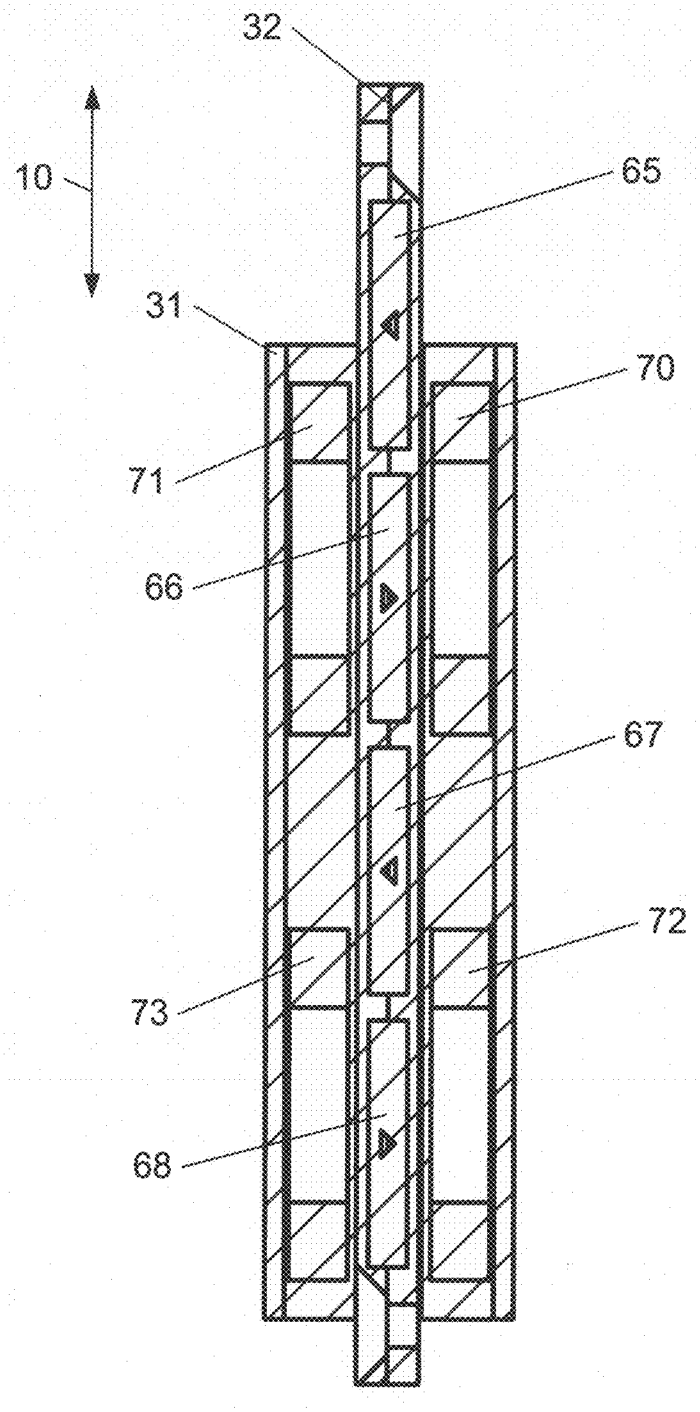
FIG. 8 shows details of an alternative magnet actuator for a morticed bolt keep according to the present disclosure.

Various alternatives are possible for the magnetic actuator 30. An alternative is described in relation to FIG. 8. In this set-up, the core assembly 32 is provided with four permanent magnets 65, 66, 67, 68. Each magnet is oriented with its magnetic axis perpendicular to the longitudinal direction 10 and each two adjacent magnets have an opposite orientation of their poles. In this way, the magnets are attracting one another in the longitudinal direction 10. The coil assembly 31 comprises four coils 70, 71, 72, 73 grouped in pairs. Each pair of coils (i.e. 70, 71 and 72, 73) are located on opposite sides of the core assembly 32 and each coil of a pair has a same magnetic polarity. In another embodiment, the four coils in the coil assembly could also be replaced with inclined coils surrounding the core assembly. FIG. 8 illustrates the actuated state of the magnetic actuator 30 with the core assembly 32 slip upwards with respect to the stationary coil assembly 31. In the rest state, the core assembly 32 is located more downwards with respect to the stationary coil assembly 31 with the (centre of the) upper magnet 65 substantially aligned with the upper parts of coils 70, 71.

Figure 9B:
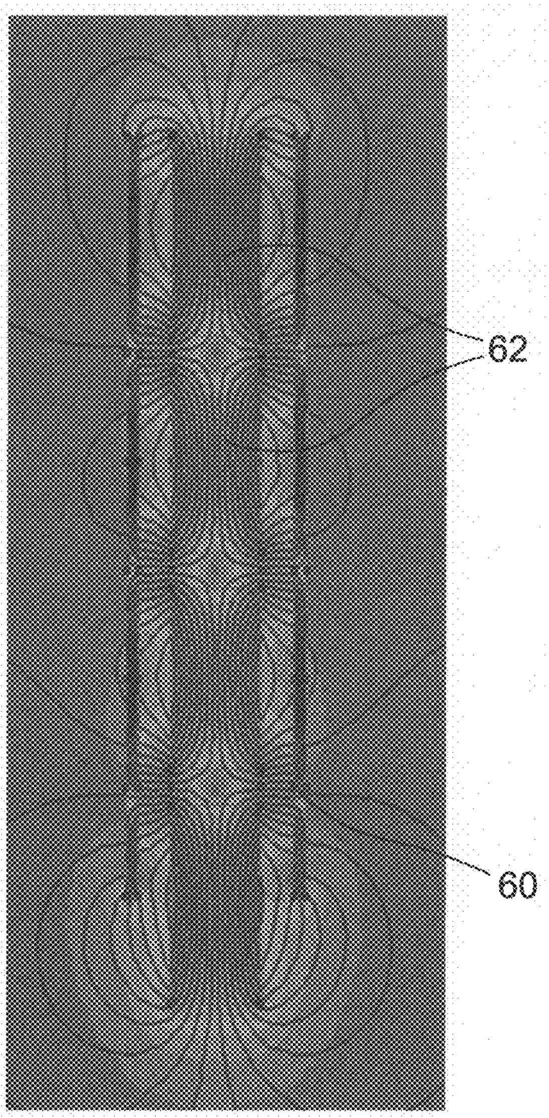

Another alternative magnetic actuator is schematically illustrated in FIG. 9B. The magnetic actuator relies on four permanent magnets 62 which repel one another in the longitudinal direction (similar to the setup used in the morticed bolt keep of FIGS. 4 to 7). The main difference is the presence of a magnetic shielding 60 surrounding the magnetic actuator. More specifically, the shielding 60 is positioned outside and around the coil assembly. The magnetic shielding 60 is typically made of a ferromagnetic material (e.g. iron) with a high magnetic susceptibility to attract magnetic field lines. The shielding 60 reduces the reluctance of the magnetic field, increases the magnetic flux into a smaller volume, and better orients the magnetic field lines to be perpendicular to the longitudinal direction.

Various other magnetic actuator configurations are possible with more or less coils, more or less permanent magnets, different orientations and/or relative placements of the magnets and coils, etc.

Although aspects of the present disclosure have been described with respect to specific embodiments, it will be readily appreciated that these aspects may be implemented in other forms within the scope of the disclosure as defined by the claims.

The invention claimed is:

1. A morticed bolt keep configured to cooperate with a lock having a latch bolt which is slidable between a retracted position and an extended position, the morticed bolt keep comprising:

- an elongated body extending in a longitudinal direction and configured to be positioned inside a hollow tubular member which extends in the longitudinal direction; and
- a cavity inside the elongated body and configured to receive the latch bolt in its extended position,
- wherein the morticed bolt keep further comprises:
  - a latch bolt engager mounted in the elongated body which is displaceable between a rest state and an actuated state; and
  - a magnetic actuator mounted inside the elongated body and configured to displace the latch bolt engager from its rest state to its actuated state upon activation, the magnetic actuator comprising:
  - a core which extends in the longitudinal direction and comprises:
    - a frame comprising a first mounting space and a second mounting space separated by a frame part, wherein the first mounting space and the second mounting space are spaced apart from one another in the longitudinal direction by the frame part;
    - a first permanent magnet mounted in the first mounting space; and a second permanent magnet mounted in the second mounting space, the permanent magnets being oriented such that they repel one another in the longitudinal direction; and a coil assembly which extends in the longitudinal direction and comprises at least one coil which is disposed at least around the frame part, wherein one of the core and the coil assembly is slidable in the longitudinal direction and is operatively connected to the latch bolt engager.

2. The morticed bolt keep according to claim 1, wherein each permanent magnet has a north pole and a south pole with a magnetic axis parallel to the longitudinal direction, wherein the first and second permanent magnets are oriented such that either their north poles or their south poles are facing one another in the longitudinal direction.

3. The morticed bolt keep according to claim 1, wherein the frame comprises a third mounting space spaced apart from the second mounting space in the longitudinal direction by a further frame part, wherein the first mounting space and the third mounting space are on opposite sides of the second mounting space in the longitudinal direction, wherein the core comprises a third permanent magnet mounted in the third mounting space, the second and third permanent magnets being oriented such that they repel one another in the longitudinal direction, wherein said at least one coil comprises a first coil and a second coil, the first coil being disposed at least around the frame part and the second coil being disposed at least around the further frame part.

4. The morticed bolt keep according to claim 1, wherein each permanent magnet has a substantially constant cross sectional area viewed perpendicular to its magnetic axis.

5. The morticed bolt keep according to claim 4, wherein each permanent magnet is a bar magnet.

6. The morticed bolt keep according to claim 1, wherein the magnetic actuator further comprises a magnetic shielding extending in the longitudinal direction and radially enclosing the coil assembly, the magnetic shielding preferably comprising a metal cylinder.

7. The morticed bolt keep according to claim 1, wherein the core is slidable in the longitudinal direction and is operatively connected to the latch bolt engager.

8. The morticed bolt keep according to claim 7, wherein the core is operatively connected to the latch bolt engager by means of a rigid rod extending between a first end and a second end, wherein the first end is pivotable with respect to the core and the second end is pivotable with respect to the latch bolt engager, and wherein the rigid rod has a first smallest angle with respect to the longitudinal direction when the latch bolt engager is in its rest state and a second smallest angle with respect to the longitudinal direction when the latch bolt engager is in its actuated state, the second smallest angle being larger than the first smallest angle.

9. The morticed bolt keep according to claim 8, wherein the rigid rod is connected to the elongated body by means of two guiding levers.

10. The morticed bolt keep according to claim 1, wherein in its rest state, the latch bolt engager is in a depressed position within the cavity and, in its actuated state, the latch bolt engager is in an extended position within the cavity, wherein the latch bolt engager is configured to push the latch bolt towards its retracted position when being displaced from its rest state to its actuated state.

11. The morticed bolt keep according to claim 1, wherein in its rest state, the latch bolt engager is in an extended position within the cavity and, in its actuated state, the latch bolt engager is in a depressed position within the cavity, wherein the latch bolt engager is configured to allow the latch bolt to slide to its extended position into the cavity when being displaced from its rest state to its actuated state, wherein the morticed bolt keep preferably comprises a biasing member inside the elongated body which exerts a biasing force urging the latch bolt engager to its rest position, the magnetic actuator being configured to, upon activation, slide said one of the core and the coil in the longitudinal direction against said biasing force.

12. A closure system comprising a closure wing and a support, the closure wing being provided with a lock having a latch bolt which is slidable between a retracted position and an extended position, the support extending in a longitudinal direction and comprising a hollow tubular member, wherein the closure system further comprises a morticed bolt keep according to claim 1 mounted in the hollow tubular member.

13. A morticed bolt keep configured to cooperate with a lock having a latch bolt which is slidable between a retracted position and an extended position, the morticed bolt keep comprising:

an elongated body extending in a longitudinal direction and configured to be positioned inside a hollow tubular member which extends in the longitudinal direction; and a cavity inside the elongated body and configured to receive the latch bolt in its extended position, wherein the morticed bolt keep further comprises:

a latch bolt engager mounted in the elongated body which is displaceable between a rest state and an actuated state; and a magnetic actuator mounted inside the elongated body and configured to displace the latch bolt engager from its rest state to its actuated state upon activation, the magnetic actuator comprising:

a core which extends in the longitudinal direction and comprises:

a frame comprising a first mounting space and a second mounting space separated by a frame part, wherein the first mounting space and the second mounting space are spaced apart from one another in the longitudinal direction by the frame part;

a first permanent magnet mounted in the first mounting space; and a second permanent magnet mounted in the second mounting space, the permanent magnets being oriented such that their magnetic axis are perpendicular to the longitudinal direction and such that they attract one another in the longitudinal direction; and a coil assembly which extends in the longitudinal direction and comprises a first coil and a second coil, wherein one of the core and the coil assembly is slidable in the longitudinal direction and is operatively connected to the latch bolt engager.

14. The morticed bolt keep according to claim 13, wherein the first and second coils are disposed adjacent the frame on opposite sides thereof and have a same magnetic polarity.

15. A morticed bolt keep configured to cooperate with a lock having a latch bolt which is slidable between a retracted position and an extended position, the morticed bolt keep comprising:

an elongated body extending in a longitudinal direction and configured to be positioned inside a hollow tubular member which extends in the longitudinal direction; and a cavity inside the elongated body and configured to receive the latch bolt in its extended position, wherein the morticed bolt keep further comprises:

a latch bolt engager mounted in the elongated body which is displaceable between a rest state and an actuated state; and a magnetic actuator mounted inside the elongated body and configured to displace the latch bolt engager from its rest state to its actuated state upon activation, the magnetic actuator comprising:

a core which extends in the longitudinal direction and comprises a permanent magnet which has a north pole and a south pole with a magnetic axis parallel to the longitudinal direction; and a coil assembly which extends in the longitudinal direction and comprises a first coil and a second coil separated from one another in the longitudinal direction, the first coil being disposed at least around the north pole and the second coil being disposed at least around the south pole, the coils having an opposite magnetic polarity, wherein one of the core and the coil assembly is slidable in the longitudinal direction and is operatively connected to the latch bolt engager.

16. A morticed bolt keep configured to cooperate with a lock having a latch bolt which is slidable between a retracted position and an extended position, the morticed bolt keep comprising:

an elongated body extending in a longitudinal direction and configured to be positioned inside a hollow tubular member which extends in the longitudinal direction; and a cavity inside the elongated body and configured to receive the latch bolt in its extended position, wherein the morticed bolt keep further comprises:

a latch bolt engager mounted inside the elongated body which is displaceable between a rest state and an actuated state;

a magnetic actuator mounted inside the elongated body and configured to displace the latch bolt engager from its rest state to its actuated state upon activation;

an electromagnet mounted inside the elongated body and a magnetic catch fixed to the magnetic actuator, the electromagnet being configured to temporarily attract the magnetic catch to maintain the latch bolt engager in its actuated state; after the latch bolt engager has been displaced by the magnetic actuator, the magnetic actuator being further configured to be turned off once the electromagnet has been activated.

17. A closure system comprising a closure wing and a support, the closure wing being provided with a lock having a latch bolt which is slidable between a retracted position and an extended position, the support extending in a longitudinal direction and comprising a hollow tubular member, wherein the closure system further comprises a morticed bolt keep according to claim 16 mounted in the hollow tubular member.

* * * * *